United States Patent [19]

Devier

[11] Patent Number: 5,448,148

[45] Date of Patent: Sep. 5, 1995

[54] APPARATUS FOR POSITIONING AN EXCAVATOR HOUSING

[75] Inventor: Lonnie J. Devier, Dunlap, Ill.

[73] Assignee: Caterpillar Inc., Peoria, Ill.

[21] Appl. No.: 174,645

[22] Filed: Dec. 27, 1993

Related U.S. Application Data

[63] Continuation-in-part of Ser. No. 897,128, Jun. 11, 1992, abandoned.

[51] Int. Cl.⁶ .............................................. G05D 16/00
[52] U.S. Cl. .................................... 318/645; 388/929; 74/DIG. 1
[58] Field of Search .............. 74/DIG. 1, 730.1; 37/DIG. 1; 318/610, 615, 645; 388/906, 929

[56] References Cited

U.S. PATENT DOCUMENTS

| | | | |
|---|---|---|---|
| 3,577,664 | 5/1971 | Sing | 37/DIG. 1 |
| 3,720,059 | 3/1973 | Schurawski et al. | 318/610 |
| 3,958,494 | 5/1976 | Miller | 318/615 |
| 4,704,923 | 11/1987 | Taylor | 74/730.1 |
| 4,879,501 | 11/1989 | Haner | 318/645 |
| 4,976,687 | 12/1990 | Martin | 74/730.1 |
| 5,085,101 | 2/1992 | Oldfield | 74/730.1 |
| 5,219,275 | 6/1993 | Ribaudo | 318/610 |

Primary Examiner—William M. Shoop, Jr.
Assistant Examiner—Karen Masih
Attorney, Agent, or Firm—David M. Masterson

[57] ABSTRACT

A method and apparatus for positioning a housing of an excavator housing. A motor receives pressurized fluid to cause rotation of the excavator housing. A motor position sensor determines the rotational position of the housing and responsively produces a housing position signal. A pressure sensor determines the fluid pressure supplied to the motor and responsively produces a pressure signal. A microprocessor produces a signal indicative of a desired rotational position of the housing. The microprocessor receives the position and pressure signals, and responsively controls fluid to the motor in order to rotate the housing to the desired position.

20 Claims, 7 Drawing Sheets

APPARATUS FOR POSITIONING AN EXCAVATOR HOUSING

This is a continuation-in-part of a prior filed patent application Ser. No. 07/897,128, filed Jun. 11, 1992 and now abandoned.

TECHNICAL FIELD

This invention relates generally to an apparatus for positioning an excavator housing and, more particularly, to an apparatus for positioning an excavator housing while accounting for gear backlash.

BACKGROUND ART

A typical excavator housing positioning system includes a hydraulic motor that rotates gears associated with a swing gear train, which in turn, rotates the housing. A closed loop control system may be used to position the excavator housing to a desired position.

Conventional closed loop control systems directly measure the parameter to be controlled. In this case, the control system directly measures the rotational position of the excavator housing, compares the measured position to a desired position and calculates an appropriate motor command to minimize the difference between the two positions. However, the manufacturing tolerances associated with the swing gear train lead to an amount of freeplay or backlash between the swing gear train and the housing. The freeplay causes the excavator housing to "drift." Because the control system attempts to control the excavator housing to the desired position, the "drifting" motion causes the control system to become unstable. The instability of the control system produces undesirable oscillations of the excavator housing.

The present invention is directed to overcoming one or more of the problems as set forth above.

DISCLOSURE OF THE INVENTION

In one aspect of the present invention an apparatus and method is disclosed for positioning an excavator housing. A motor is adapted to receive pressurized fluid and responsively rotate the excavator housing. A motor position sensor determines the rotational position of the housing and responsively produces a housing position signal. A pressure sensor determines the fluid pressure supplied to the motor and responsively produces a pressure signal. A microprocessor produces a signal indicative of a desired rotational position of the housing. The microprocessor receives the position and pressure signals, and responsively controls fluid to the motor in order to rotate the housing to the desired position.

BRIEF DESCRIPTION OF THE DRAWINGS

For a better understanding of the present invention, reference may be made to the accompanying drawings in which.

BEST MODE FOR CARRYING OUT THE INVENTION

The present invention is particularly suited for controlling the rotational position of an excavator housing. Advantageously, the present invention accounts for backlash associated with the mechanical drive system and controls the rotational position of the excavator housing in a stable manner.

Figure 1:
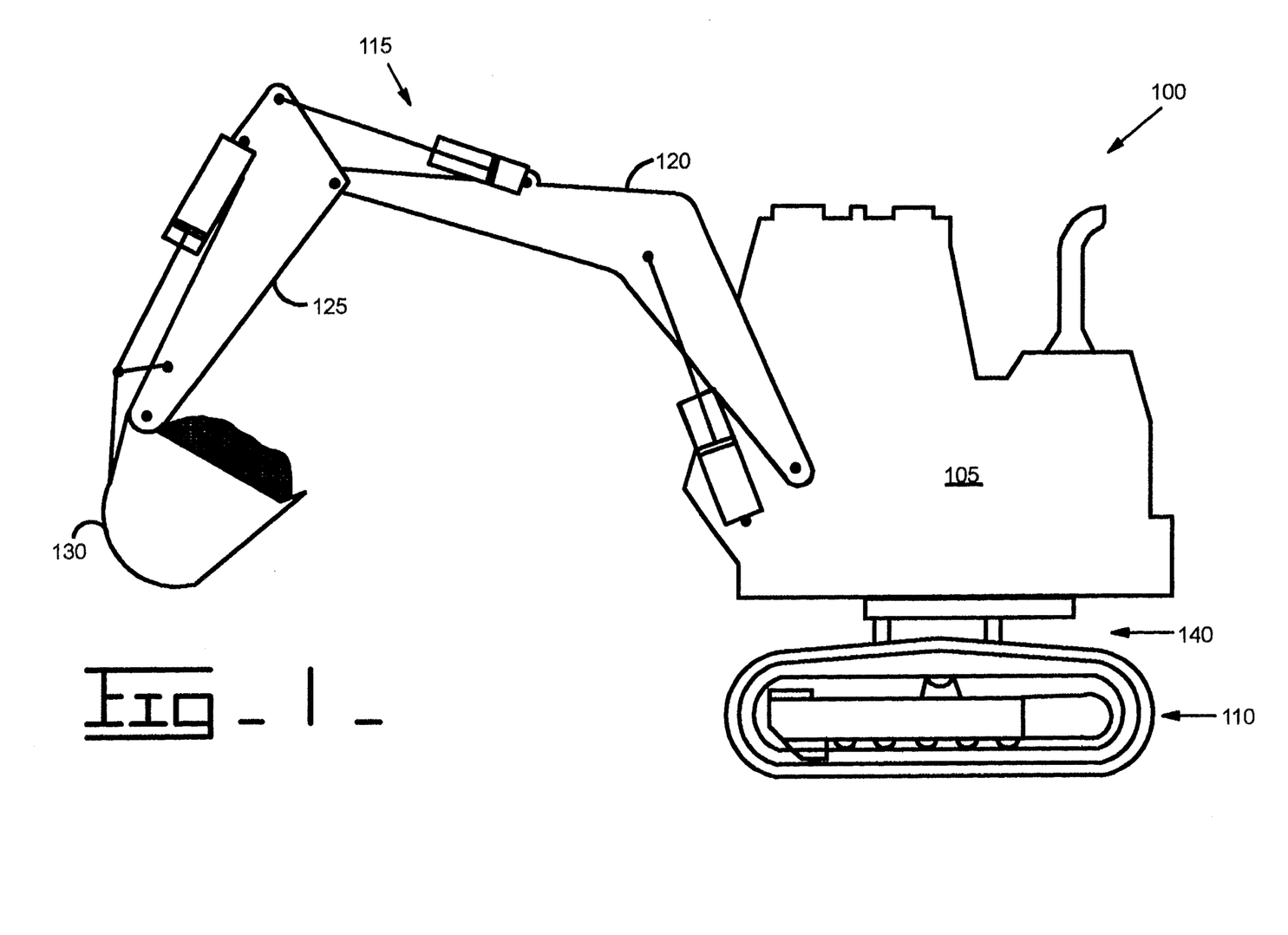
FIG. 1 is a diagrammatic view of a hydraulic excavator.

A typical excavator 100 is shown in relation to FIG. 1. A housing 105 sits on top of an undercarriage 110. A work implement 115 is mounted on the housing 105. The work implement 115 includes a boom 120, stick 125, and bucket 130. A drive assembly 140 rotates the housing relative to the undercarriage 110.

Figure 2:
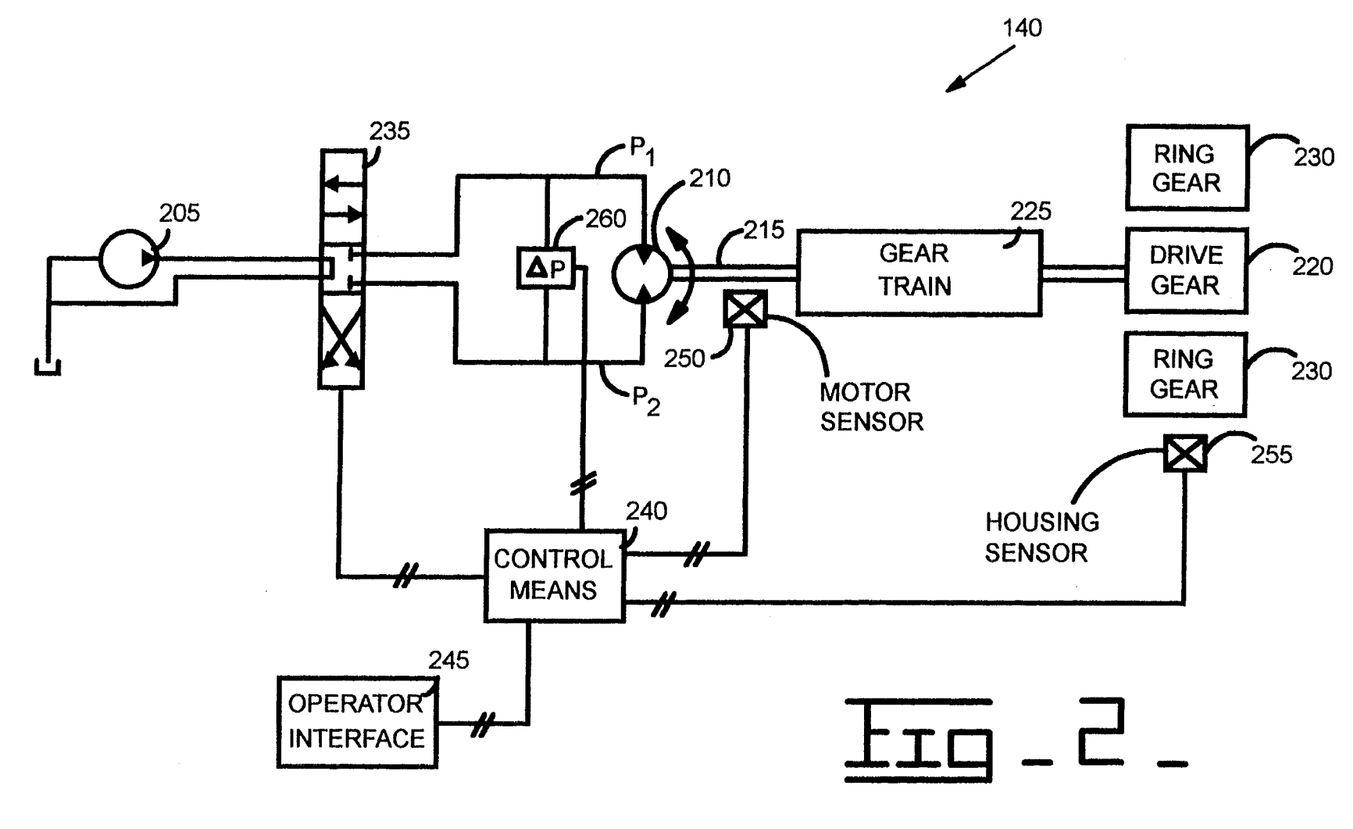
FIG. 2 is an electohydraulic circuit schematic associated with a drive assembly of the hydraulic excavator.

The drive assembly 140 is shown in FIG. 2. A pump 205 supplies pressurized fluid via fluid lines denoted by $P_1, P_2$ to a hydraulic motor 210. In response to receiving the fluid, the motor rotates a drive shaft 215. The drive shaft 215 is coupled to a drive gear 220 via gear train 225. The gear train 225 may comprise a plurality of planetary gear sets as is well known in the art. The actual configuration of the planetary gear sets are not critical to the present invention and will not be shown herein. The drive gear 220 is meshed with a large ring gear 230 that is attached to the excavator undercarriage 110. Here, the drive gear 220 is an extension of the excavator housing 105 and rotates about the large ring gear 230 to rotate the housing 105 relative to the undercarriage 105. Because of the large size of the drive gear and ring gear, the manufacturing tolerances of the individual gear teeth introduces an amount of freeplay or backlash between the load gear and ring gear.

Although the drive gear 220 is shown as an extension of the excavator housing 105, it is noted that the drive gear may alternately be an extension of the excavator undercarriage 110. In this alternate configuration, the large ring gear may be attached to the housing 105. Thus, the drive gear 220 may either rotate the ring gear 230 or rotate about the ring gear 230, depending upon the gearing configuration. In either configuration, the present invention is adapted to control the rotation of the housing.

A three-way hydraulic control valve 235 regulates fluid flow to/from the motor 205. Typically, the control valve 235 is operated by a pilot valve (not shown) that is controlled by a control means 240. However, for the purposes of this discussion, the control means 240 is assumed to directly control the operation of the three-way valve 220 in response to commands from an operator interface 245. In the preferred embodiment the control means 240 is a microprocessor based system that utilizes arithmetic units for controlling processes. The operator interface 240 may include electronic joysticks adapted to produce command signals indicative of a desired velocity or position of the excavator housing 105. However, if automatic excavator control is desired, the control means 240 may itself produce the desired position and/or velocity command signals.

The control means 240 receives positional and/or velocity information from motor and housing sensors 250,255. The motor sensor 250 produces motor position and/or velocity signals in response to the rotation of the drive shaft 215. The housing sensor 235 produces housing position and/or velocity signals in response to the rotation of the excavator housing 105.

The control means also receives a pressure signal from a pressure sensing means 260. The pressure signal is indicative of the torque imposed on the hydraulic motor 210. The pressure sensing means 240 may include either two pressure sensors that directly measure the pressure associated with each fluid line, $P_1,P_2$ or a single differential pressure sensor that measures the pressure difference between $P_1$ and $P_2$. Each of these type of sensors are well known in the art.

Figure 3:
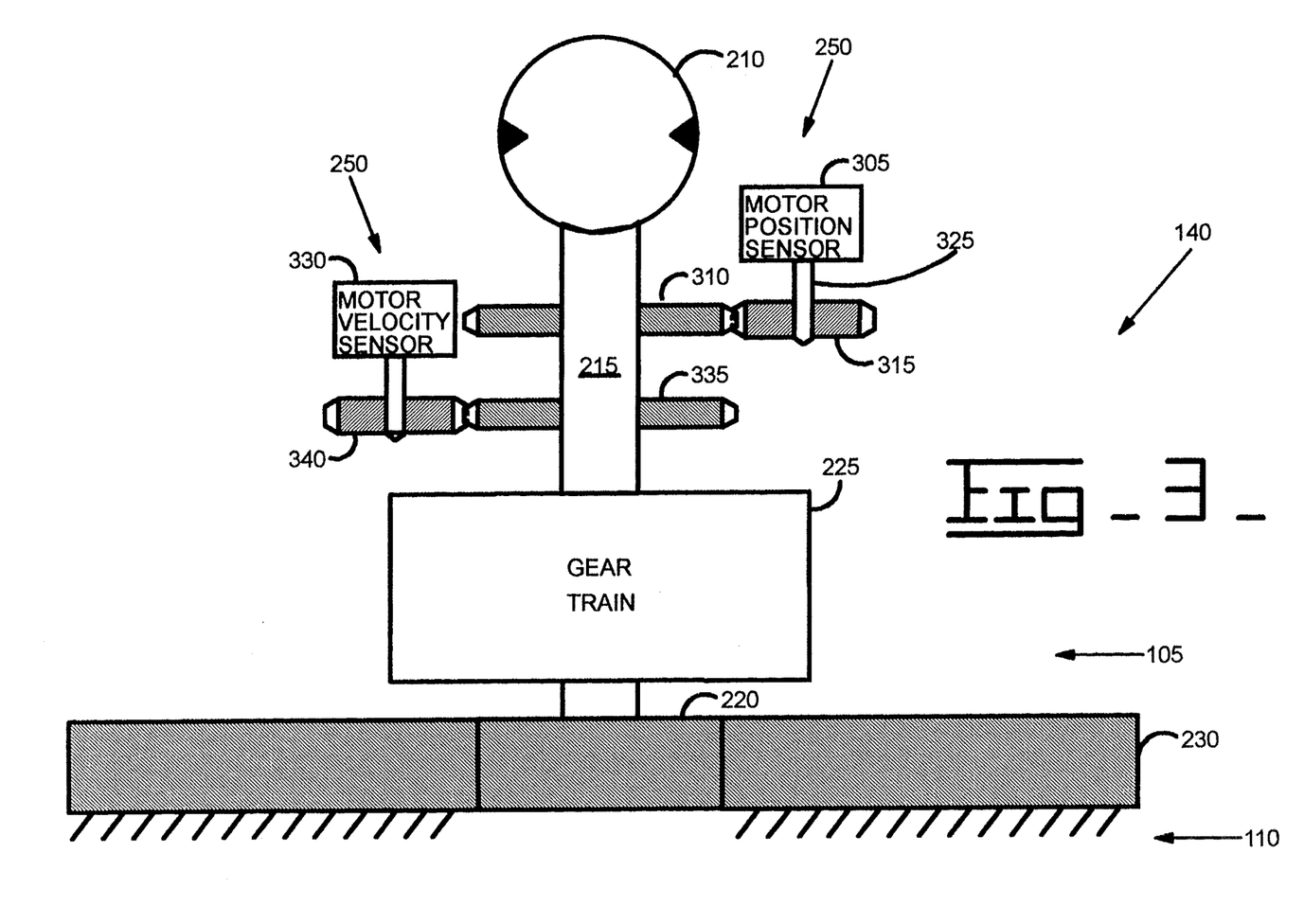
FIG. 3 is a block diagram of a sensor assembly associated with the present invention.

Referring to FIG. 3, the motor sensor assemblies are shown. A motor position sensor 305 includes a secondary gear 310 and a sensing gear 315. The secondary gear 310 is fixedly connected to the drive shaft 215. The sensing gear 315 is meshed with the secondary gear 310. The sensing gear 315 and the secondary gear 320 establishes a gear ratio that is proportional to the gear ratio between the drive gear 220 and the ring gear 230.

The motor position sensor 305 includes a shaft 325 that is connected to and rotates with the sensing gear 315. Responsively, the motor position sensor 305 produces the motor position signal, which is representative of an estimated rotational position of the excavator housing 105 relative to the undercarriage 110.

Also shown is a motor velocity sensor 330 which comprises a secondary gear 335 and a sensing gear 340. The motor velocity sensor 330 produces a motor velocity signal that is indicative of an estimated rotational velocity of the excavator housing 105 relative to the undercarriage 110. The gear ratio between the secondary gear 335 and sensing gear 340 should be greater than the gear ratio between the drive gear 220 and the ring gear 230 to achieve a high sampling rate. Although a motor velocity sensor 330 is shown, the motor velocity signal may alternately be produced by differentiating the motor position signal.

The housing sensor 255 senses the rotation of the housing 105 by well known methods. For example, the housing sensor 255 may sense the motion of an excavator swivel joint (not shown) in a manner well known in the art. The housing velocity may be derived from the housing position signal by well known differentiation techniques. The actual configuration of the housing sensor 255 is not critical to the present invention.

The sensors may, for example, include such well known devices as: a Hall effect device, a resolver, a tachometer, or a rotary potentiometer.

Figure 4:
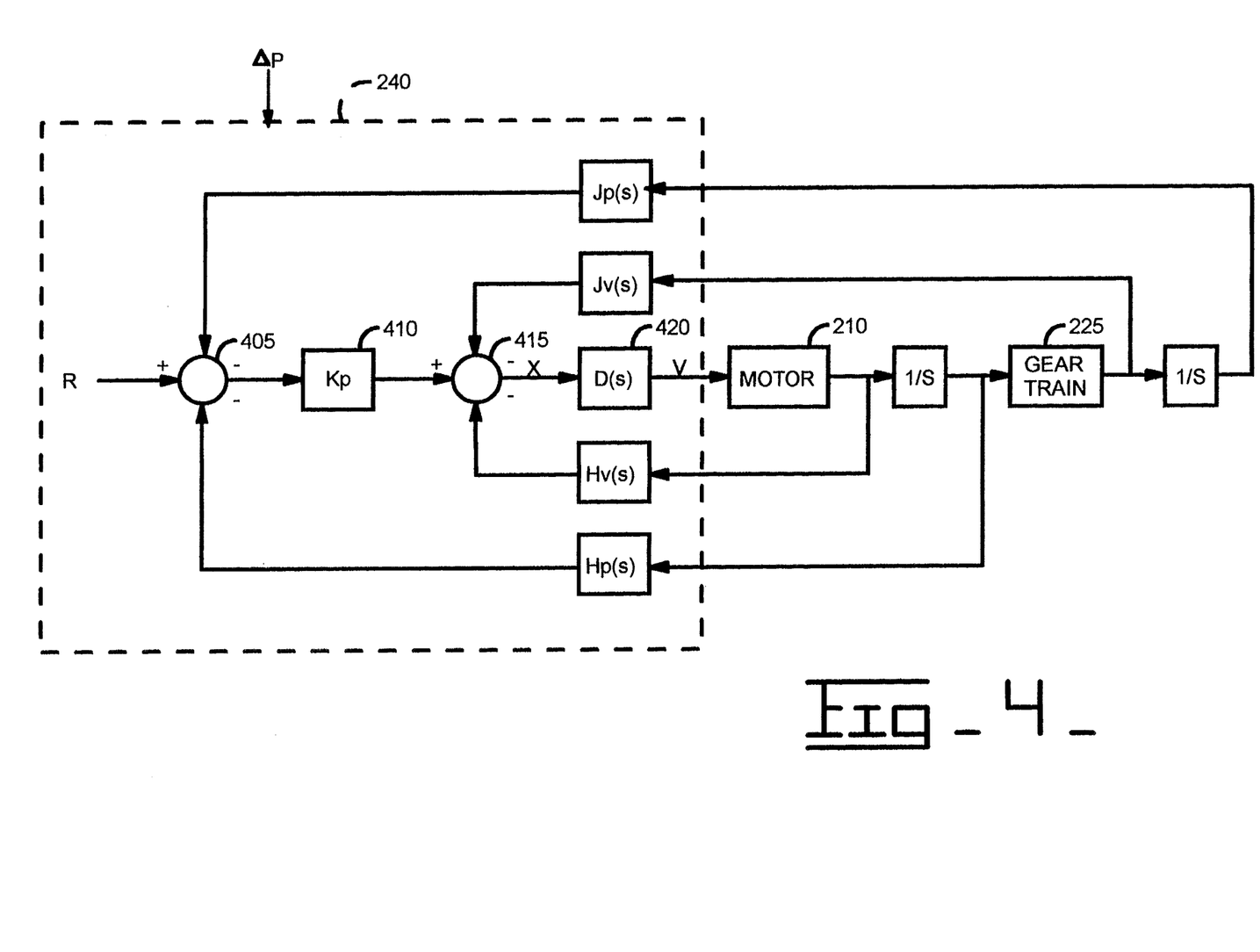
FIG. 4 is a block diagram of an embodiment of a control system associated with the present invention.

One embodiment of a control system associated with the present invention is shown in the block diagram of FIG. 4. The control means 240 produces a reference input signal, R, in response to receiving a desired position or velocity signal. The reference input signal, R, is delivered to summing junction 405. At summing junction 405, the reference input signal, R, is combined with a motor position signal represented by, $H_p(s)$ and a housing position signal represented by $J_p(s)$. The result of summing junction 405 is multiplied by proportional gain $K_p$ at block 410. At summing junction 415, motor velocity signal represented by $H_v(s)$ is combined with housing velocity signal represented by $J_v(s)$. Compensator 420 then implements either Proportional Integral (PI), Proportional Derivative (PD), Proportional Integral Derivative (PID), or other closed loop control schemes in a well known manner.

Figure 5:
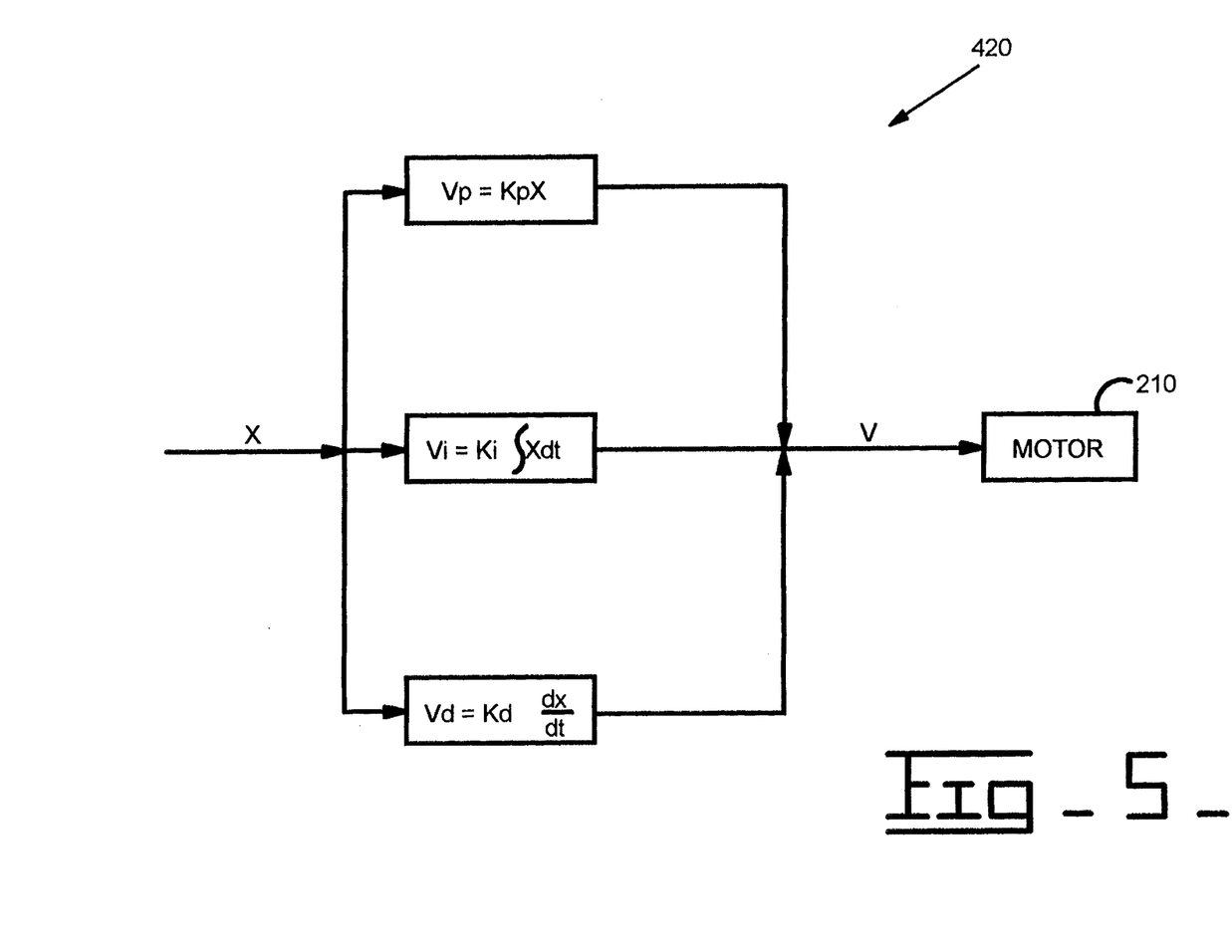
FIG. 5 is a block diagram of a feedback control associated with the present invention.

One example of a PID control is shown in FIG. 5. The PID control is represented by the equation, $V = V_p + V_i + V_d$. The result, V, is converted to a command signal that is delivered to the control valve 235 to regulate fluid flow to the hydraulic motor 210. The values $K_p + K_i + K_d$ are determined from simulation and analysis of empirical data in response to machine dynamics. It will be readily apparent to those skilled in the art that the PID constant values may be a wide range of numerical values depending on the desired gain of the feedback system.

Industrial Applicability

As earlier stated, error may be introduced into the final position of the excavator housing 105 due to the play or backlash between the drive gear 220 and ring gear 230. To overcome these effects, the present invention makes use of the differential fluid pressure across the hydraulic motor 210 to modify control criteria.

Figure 6:
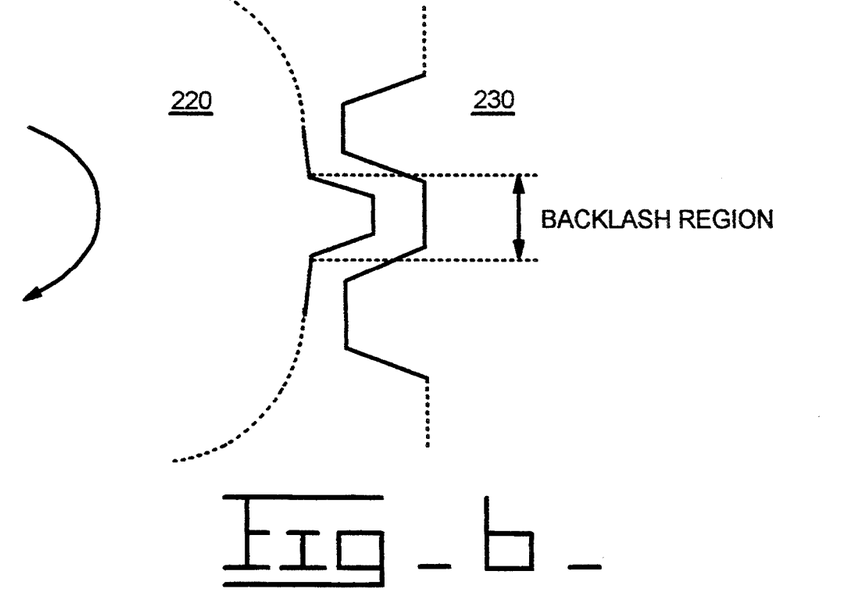
FIGS. 6,7,8 are simplified diagrams showing the gear backlash of the drive assembly gearing.

For example, the pressure information may be used to determine when the mechanical system is operating in the "backlash region". The backlash region is graphically illustrated in FIG. 6. FIG. 6 is a simplified drawing that shows the relationship between the teeth of the drive gear 220 and the teeth of the ring gear 230. When the teeth of the drive gear 220 are within the backlash region, substantially no torque is imposed on the drive system 140. Consequently the pressure signal will indicate substantially zero differential pressure between $P_1$ and $P_2$, signifying that the mechanical system is operating in the backlash region.

An example of the operation of the drive system 140 will now be described. For this example, assume that the excavator 100 is on a slope and it is desired to rotate the housing 105 clockwise, toward the "down-hill" side of the slope.

Figure 7:
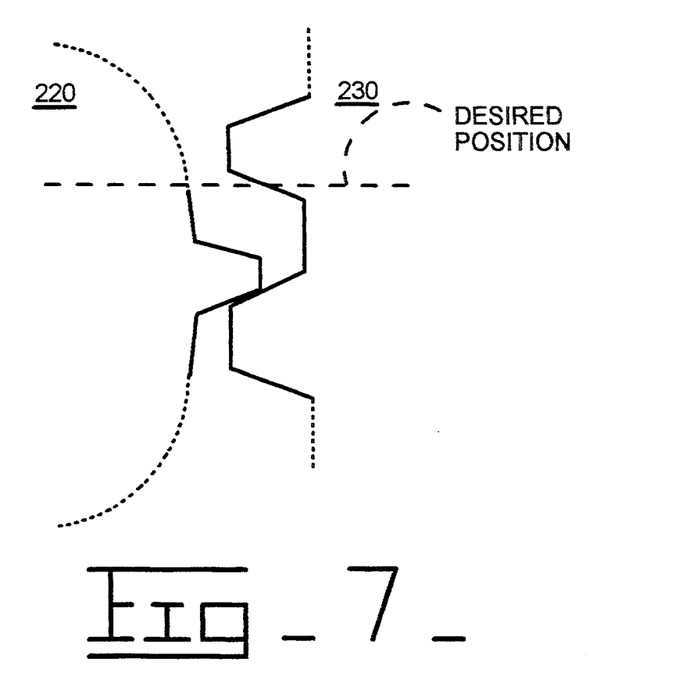

To position the housing 105, the control means 140 controls the valve 230 to deliver a high rate of fluid flow, via supply line $P_1$, to the motor 210 to rotate the housing 105 clockwise. Once the housing 105 is within a predetermined range of the desired position, the control means 240 controls the valve 235 to deliver a lower rate of fluid flow to the motor 210 to slow the housing rotation. Here, the rotational velocity of the housing falls below a predetermined velocity. When the housing 105 reaches the desired position, the control means 240 controls the valve 235 to stop the flow of fluid to the motor 210. However, because of the gear backlash, momentum causes the housing 105 to continue rotating until the drive gear 220 engages the ring gear 230. Consequently, the housing "overshoots" the desired position, as shown in FIG. 7.

While the motor 210 is rotating the housing 105, the pressure associated with $P_1$ is greater than the pressure associated with $P_2$. While the motor 210 is stopped and the mechanical system is within the backlash region, the pressures associated with $P_1$ and $P_2$ are substantially equal. However, once the housing 105 rotates through the backlash region, the pressure associated with $P_2$ will be greater than $P_1$.

Alternatively, if instead of being rotated "down-hill", the housing 105 were rotated "up-hill", the pressure of $P_1$ would always be greater than $P_2$. This pressure condition indicates that the housing 105 did not move through the backlash region.

Thus, depending on the pressure information, the control means 240 is able to anticipate if the mechanical system will operate in the backlash region and take corrective action by modifying the control criteria. The control means 240 uses the pressure information to modify the control criteria according to the following methods.

It is noted that the control means 240 may only perform the following modifications when the rotational velocity of the housing 105 is less than the predetermined velocity because the gear backlash may not effect the system at higher velocities.

One method pertains to modifying the input signal, R, by an amount equal to the backlash in response an equalized pressure condition, e.g., the pressure of $P_1$ being equal to $P_2$. This will prevent the control from entering a limit cycle situation since the housing 105 cannot be positioned exactly at the desired location. This method may be used if high accuracy is not required.

Another method pertains to modifying the control gains of the compensator 420. Continuing with the present example, the compensator 420 may utilize "high" or quick responding control gains to position the excavator housing 105 quickly to the desired position in response to a differential pressure condition, e.g., the pressure of $P_1$ being greater than $P_2$. Alternately, the compensator 420 may utilize "low" or slow responding control gains to position the housing to the desired position with negligible overshoot in response to an equalized pressure condition, e.g., $P_1$ being equal to $P_2$.

Figure 8:
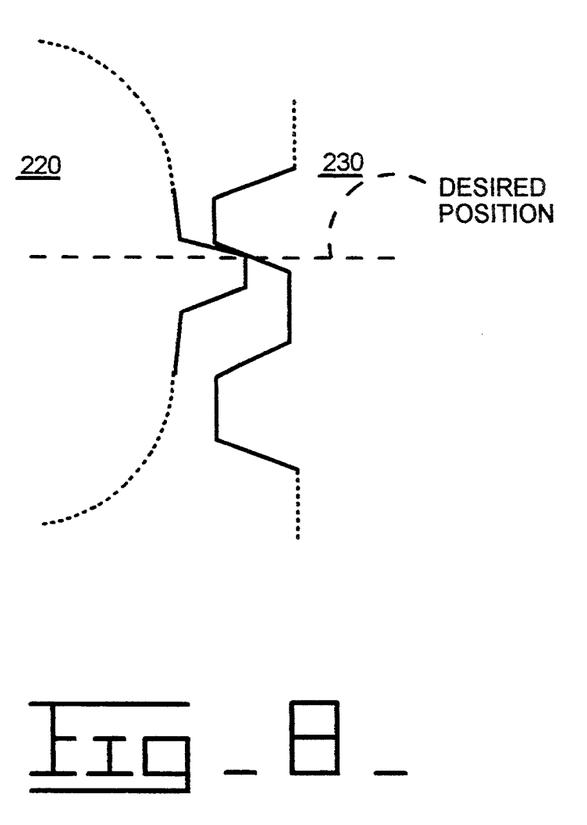

Yet another method may be utilized to give high positional accuracy. Assume that the housing 105 has rotated past the desired position through the backlash region. The motor 210 may then rotate the housing 105 in the opposite direction, counterclockwise, until the pressure of $P_2$ is greater than $P_1$, which indicates that the drive gear 220 has engaged the ring gear 230 and is at the desired position, shown by FIG. 8.

Another method pertains to utilizing only the positional information provided by the housing sensor 255 in response to a differential pressure condition, e.g. the pressure of $P_1$ being greater than $P_2$. During this condition, no backlash or freeplay is occurring. Thus, the information provided by the housing sensor 250 is considered to be accurate.

Finally, the control means 240 may only utilize information from the motor sensor 250 in response to an equalized pressure condition, e.g. $P_1$ being equal to $P_2$. Information from the motor sensor 250 is used because information provided by the housing sensor is imprecise due to play between the ring gear 230 and drive gear 220.

The use of the pressure information helps the control means 240 determine if the housing is rotating downhill, up-hill, or level, which allows the control means 240 to anticipate if the mechanical system will incur backlash in order to perform the necessary control modifications.

Other aspects, objects and advantages of the present invention can be obtained from a study of the drawings, the disclosure and the appended claims.

The invention claimed is:

1. An apparatus for positioning an excavator housing, comprising:
   a pump for producing pressurized fluid;
   a motor having a drive gear, the motor receiving the pressurized fluid and responsively rotating the drive gear to cause rotation of the excavator housing;
   a control valve for regulating fluid flow from the pump to the motor;
   means for determining the rotational position of the housing and responsively producing a housing position signal;
   means for determining the fluid pressure supplied to the motor and responsively producing a pressure signal;
   means for producing a signal indicative of a desired rotational position of the housing; and
   control means for receiving the position and pressure signals, and responsively controlling the control valve in order to rotate the housing to the desired position.

2. An apparatus, as set forth in claim 1, including means for determining the velocity of the housing and responsively producing a housing velocity signal.

3. An apparatus, as set forth in claim 2, including means for determining the rotational position of the motor and responsively producing a motor position signal.

4. An apparatus, as set forth in claim 3, including means for determining the rotational velocity of the motor and responsively producing a motor velocity signal.

5. An apparatus, as set forth in claim 4, including means for receiving the desired position signal, the motor position signal, and the housing position signal, and responsively producing an error position signal.

6. An apparatus, as set forth in claim 5, including means for receiving the error position signal and responsively multiplying the magnitude of the error position signal by a proportional gain value.

7. An apparatus, as set forth in claim 6, including means for receiving the proportional error position signal, the motor velocity signal, and the housing velocity signal, and responsively producing an error velocity signal.

8. An apparatus, as set forth in claim 7, including means for receiving the error velocity signal and responsively producing a command signal to the valve in response to Proportional+Integral+Derivative (PID) control.

9. An apparatus, as set forth in claim 8, including means for receiving the pressure signal and responsively modifying the gains of the PID control.

10. An apparatus, as set forth in claim 9, including means for receiving the pressure signal and responsively modifying the magnitude of the desired position signal.

11. A method for positioning a housing of an excavator, a motor receives pressurized fluid to cause rotation of the excavator housing, comprising:
    determining the rotational position of the housing and responsively producing a housing position signal;
    determining the fluid pressure supplied to the motor and responsively producing a pressure signal;
    producing a signal indicative of a desired rotational position of the housing; and
    receiving the position and pressure signals, and responsively controlling fluid to the motor in order to rotate the housing to the desired position.

12. A method, as set forth in claim 11, including the steps of determining the velocity of the housing and responsively producing a housing velocity signal.

13. A method, as set forth in claim 12, including the steps of determining the rotational position of the motor and responsively producing a motor position signal.

14. A method, as set forth in claim 13, including the steps of determining the rotational velocity of the motor and responsively producing a motor velocity signal.

15. A method, as set forth in claim 14, including the steps of receiving the desired position signal, the motor position signal, and the housing position signal, and responsively producing an error position signal.

16. A method, as set forth in claim 15, including the steps of receiving the error position signal and responsively multiplying the magnitude of the error position signal by a proportional gain value.

17. A method, as set forth in claim 16, including the steps of receiving the proportional error position signal, the motor velocity signal, and the housing velocity signal, and responsively producing an error velocity signal.

18. A method, as set forth in claim 17, including the steps of receiving the error velocity signal and responsively producing a command signal to the valve in response to Proportional+Integral+Derivative (PID) control.

19. A method, as set forth in claim 18, including the steps of receiving the pressure signal and responsively modifying the gains of the PID control.

20. A method, as set forth in claim 19, including the steps of receiving the pressure signal and responsively modifying the magnitude of the desired position signal.

* * * * *